(12) United States Patent
Sato (10) Patent No.: US 6,597,534 B1
(45) Date of Patent: Jul. 22, 2003

(54) THIN-FILM MAGNETIC HEAD SUITABLE FOR NARROWER TRACKS AND PREVENTING WRITE FRINGING AND METHOD FOR MAKING THE SAME

(75) Inventor: Kiyoshi Sato, Niigata-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 103 days.

(21) Appl. No.: 09/610,445

(22) Filed: Jul. 5, 2000

(30) Foreign Application Priority Data

Jul. 6, 1999 (JP) .......................................... 11-191649
Oct. 12, 1999 (JP) .......................................... 11-289702

(51) Int. Cl.[7] .................................................. G11B 5/31
(52) U.S. Cl. ...................................................... 360/126
(58) Field of Search ................................. 360/126, 117, 360/119, 120, 121, 122, 125, 320

(56) References Cited

U.S. PATENT DOCUMENTS

| | | | |
|---|---|---|---|
| 5,155,646 A | * 10/1992 | Fujisawa et al. | ............ 360/126 |
| 5,452,164 A | 9/1995 | Cole et al. | |
| 5,559,653 A | * 9/1996 | Shouji et al. | ................ 360/126 |
| 5,649,351 A | 7/1997 | Cole et al. | |
| 5,652,687 A | 7/1997 | Chen et al. | |
| 5,802,700 A | 9/1998 | Chen et al. | |
| 6,188,544 B1 | * 2/2001 | Mino | .......................... 360/126 |
| 6,198,597 B1 | * 3/2001 | Tateyama et al. | ........... 360/126 |
| 6,274,256 B1 | * 8/2001 | Watanabe et al. | ........... 428/692 |
| 6,282,776 B1 | * 9/2001 | Otsuka et al. | ........... 29/603.14 |

FOREIGN PATENT DOCUMENTS

JP 5-166132 7/1993

* cited by examiner

Primary Examiner—William Klimowicz
Assistant Examiner—Dzung C. Nguyen
(74) Attorney, Agent, or Firm—Brinks Hofer Gilson Lione (57) ABSTRACT

In a method for making a thin-film magnetic head, a primary insulating layer is formed on a lower core layer. An auxiliary insulating layer is formed on the primary insulating layer. A groove defining a track width is formed on the primary insulating layer. Sloping faces are formed in the auxiliary insulating layer. The sloping faces are symmetrically formed and converge toward the lower core layer in the track width direction. The resulting groove has a width which is smaller than the resolution of a resist layer in a reactive ion etching process.

2 Claims, 7 Drawing Sheets

THIN-FILM MAGNETIC HEAD SUITABLE FOR NARROWER TRACKS AND PREVENTING WRITE FRINGING AND METHOD FOR MAKING THE SAME

BACKGROUND OF THE INVENTION

1. Field of the Invention

The present invention relates to thin-film magnetic heads for writing used in floating magnetic heads. In particular, the present invention relates to a thin-film magnetic head which is suitable for narrower tracks and which can suppress write fringing. The present invention also relates to a method for making the thin-film magnetic head.

2. Description of the Related Art

Figure 13:
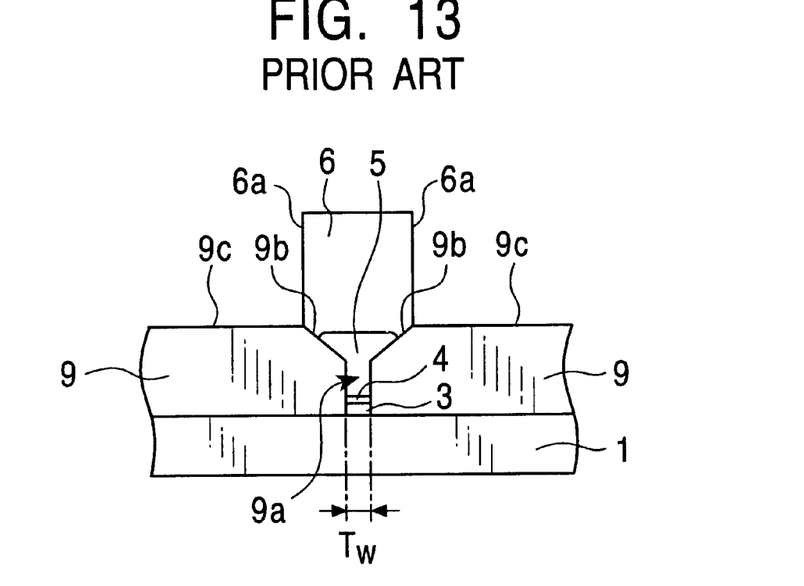
FIG. 13 is a partial front view showing an a conventional thin-film magnetic head according to the prior art.

FIG. 13 is a partial front view of a conventional thin-film magnetic head viewed from a face opposing a recording medium, the air bearing surface (ABS). This thin-film magnetic head is an inductive write head. A MR read head may be provided under this inductive head.

The inductive head has a lower core layer 1 and an insulating layer 9 formed of an insulating material such as $SiO_2$ on the lower core layer 1. The insulating layer 9 has a groove 9a. A lower magnetic pole layer 3, a magnetic gap layer 4, an upper magnetic pole layer 5, and an upper core layer 6 are formed, in that order, in the groove 9a. The lower magnetic pole layer 3 is magnetically coupled with the lower core layer 1, whereas the upper magnetic pole layer 5 is magnetically coupled with the upper core layer 6.

The groove 9a has a base section having a track width $T_w$ and an upper section having sloping faces 9b which gradually converge from a surface 9c of the insulating layer 9 in the track width direction. The upper core layer 6 is formed over the upper magnetic pole layer 5 and the sloping faces 9b.

Figure 14:
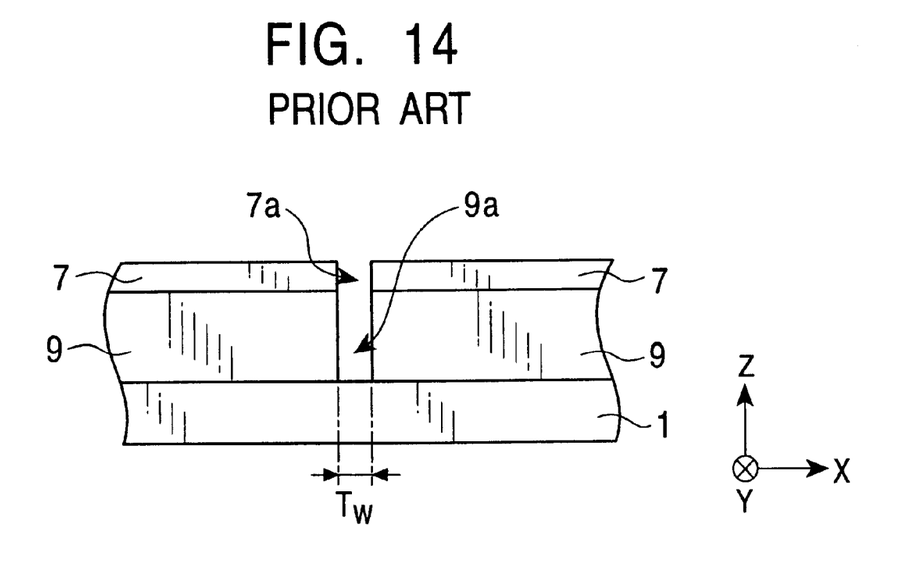
FIG. 14 is a partial front view showing the layers for making the conventional thin-film magnetic head shown in FIG. 13.

FIGS. 14 to 16 show steps for making the thin-film magnetic head shown in FIG. 13. With reference to FIG. 14, the insulating layer 9 is formed on the lower core layer 1 and then a resist layer 7 is formed thereon. The resist layer 7 is exposed and developed to form a predetermined gap 7a by patterning. The gap 7a is formed in the perpendicular direction (in the Z direction in the drawing) to the lower core layer 1 and has a constant width $T_w$. The exposed portion of the insulating layer 9 is etched by a reactive ion etching (RIE) process to form the groove 9a having the width $T_w$. Thus, the track width $T_w$ is defined by the width of the gap 7a formed in the resist layer 7.

Figure 15:
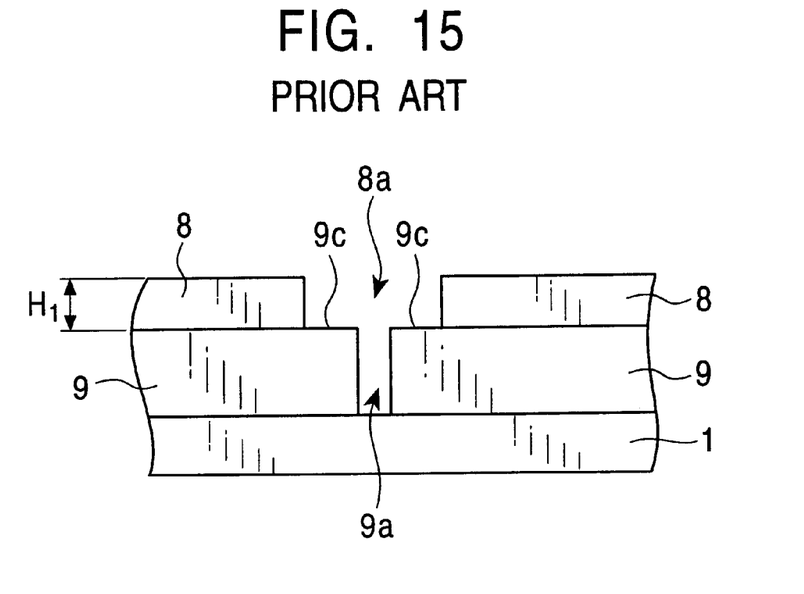
FIG. 15 is a partial front view showing the removal of the resist layer of the thin-film magnetic head shown in FIG. 13.

With reference to FIG. 15, the resist layer 7 is removed and then a resist layer 8 having a gap 8a which is larger than the groove 9a is formed on the groove 9a by a patterning process. The resist layer 8 has a thickness $H_1$. Since the thickness $H_1$ of the resist layer 8 is larger than the width $T_w$ of the groove 9a in the insulating layer 9, the surfaces 9c of the insulating layer 9 are partially exposed in the gap 8a.

Figure 16:
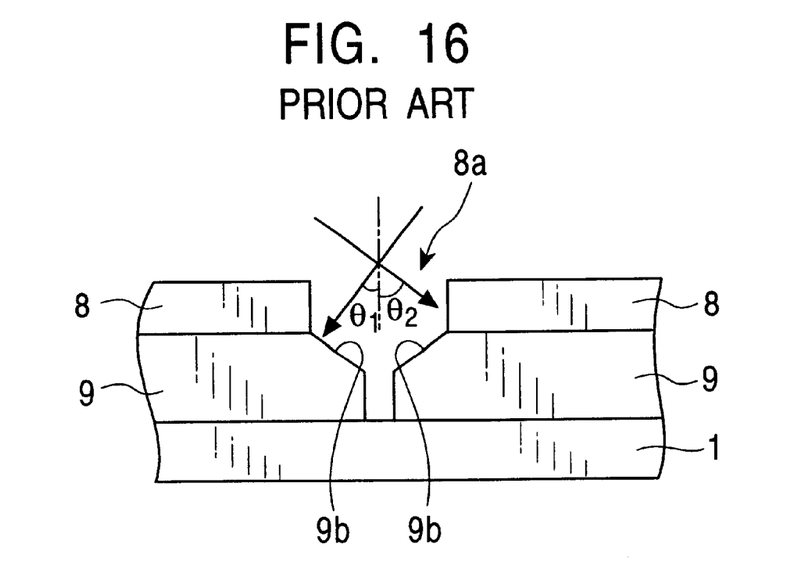
FIG. 16 is a partial front view showing the etched surfaces of the insulating layer of the thin-film magnetic head shown in FIG. 13.

With reference to FIG. 16, the surfaces 9c of the insulating layer 9 are obliquely etched by ion milling to form the sloping faces 9b.

In the thin-film magnetic head which is formed by the steps shown in FIGS. 14 to 16 and which is shown in FIG. 13, the track width $T_w$ can be formed to be 1.0 μm or less. Moreover, the upper core layer 6 is formed on the sloping faces 9b in the groove 9a of the insulating layer 9. Thus, the upper core layer 6 is properly distant from the lower magnetic pole layer 3 which is magnetically coupled with the lower core layer 1 so that write fringing is effectively prevented.

This conventional thin-film magnetic head, however, is suitable for future narrower track widths. The width (resolution) of the gap 7a formed by the patterning step shown in FIG. 14 significantly depends on the wavelength used in the exposure and developing process. The shorter the wavelength, the higher the resolution. Since the resolution is limited, the gap 7a cannot have a width which is smaller than the resolution limit.

As described in the patterning step shown in FIG. 14, the width of the groove 9a defining the track width $T_w$ is substantially the same as the width of the gap 7a formed in the resist layer 7 by patterning. In the method for defining the track width $T_w$, which transfers the gap 7a to the groove 9a using the RIE process, a track width $T_w$ which is smaller than the width of the resist layer 7, which is limited by the resolution, cannot be formed.

In the ion milling step shown in FIG. 16, the incident angles $\theta_1$ and $\theta_2$ of ions entering from the right and left sides, respectively, in the drawing are different from each other due to an uneven ion distribution. As a result, the tilted angles of the sloping faces 9b are different between the left and the right, and these sloping faces 9b are not symmetrically arranged.

As the track width $T_w$ is decreased, the imbalance between the tilted angles of the sloping faces 9b is significant when the resist layer 8 on the insulating layer 9 is unevenly distributed or when the resist layer 8 has a large thickness $H_1$.

Referring to FIG. 13, when the tilted angles of the right and left sloping faces 9b are different from each other, a fringing magnetic field will be easily generated between the upper core layer 6 on the sloping faces 9b and, for example, the lower magnetic pole layer 3 magnetically coupled with the lower core layer 1. As a result, write fringing cannot be effectively prevented.

SUMMARY OF THE INVENTION

It is an object of the present invention to provide a thin-film magnetic head which has a track width $T_w$ smaller than the resolution of a resist and which effectively prevents write fringing.

It is another object of the present invention to provide a method for making the thin-film magnetic head.

According to an aspect of the present invention, a thin-film magnetic head includes: a lower core layer, the lower core layer optionally having a lower magnetic pole layer thereon; an upper core layer, the upper core layer optionally having an upper magnetic pole layer thereunder; at least one insulating layer disposed between the lower core layer and the upper core layer, the insulating layer having a groove for defining a track width; at least one of the lower magnetic pole layer and the upper magnetic pole layer being provided in the groove; and a magnetic gap layer provided between the lower core layer and the upper core layer. The insulating layer includes at least one primary insulating layer lying at the lower core layer side and at least one auxiliary insulating layer formed on the primary insulating layer, the groove is formed at least in the primary insulating layer, the auxiliary insulating layer has sloping faces gradually diverging in the track width direction from both top edges of the groove to the surfaces of the auxiliary insulating layer, and the upper core layer is formed on the sloping faces.

In the present invention, the primary insulating layer is formed on the lower core layer and the auxiliary insulating layer is formed thereon. The auxiliary insulating layer has the groove for defining the track width $T_w$. The track width $T_w$ is smaller than the resolution of a resist, and is preferably not more than 0.7 μm, more preferably not more than 0.5 μm, and most preferably not more than 0.3 μm.

Moreover, the auxiliary insulating layer has sloping faces which gradually diverge in the track width direction from both top edges of the groove to the surfaces of the auxiliary insulating layer. The upper core layer, which may include the upper magnetic pole layer, is formed on the sloping faces. Since the sloping faces are symmetrically formed, write fringing is effectively prevented.

The sloping faces may be formed by etching the auxiliary insulating layer or by forming the auxiliary insulating layer by a sputtering process.

Preferably, the etching rate of the primary insulating layer in reactive ion etching is higher than the etching rate of the auxiliary insulating layer.

Preferably, the primary insulating layer comprises at least one insulating material selected from the group consisting of $Al_2O_3$, $SiO_2$, $Ta_2O_5$. Preferably TiO, AlN, AlSiN, TiN, SiN, NiO, WO, $WO_3$, BN, CrN, and SiON, and the auxiliary insulating layer comprises at least one insulating material selected from the group consisting of $Al_2O_3$, $Si_3N_4$, AlN, and SiON.

In this combination of the insulating materials, the etching rate of the primary insulating layer becomes higher than the etching rate of the auxiliary insulating layer.

More preferably, the etching rate of the primary insulating layer is at least ten times higher than the etching rate of the auxiliary insulating layer. In order to satisfy this condition, it is preferable that the primary insulating layer comprise at least one of $SiO_2$ and SiON and the auxiliary insulating layer comprise at least one of $Al_2O_3$ and $Si_3N_4$.

According to another aspect of the present invention, a method for making a thin-film magnetic head includes the steps of:

(a) forming at least one primary insulating layer on a lower core layer, (b) forming at least one auxiliary insulating layer using an insulating material having an etching rate which is lower than the etching rate of a material for the primary insulating layer in reactive ion etching, (c) forming a resist layer having a predetermined gap on the auxiliary insulating layer, (d) etching the auxiliary insulating layer exposed by the gap by an ion milling process to form sloping faces which converge toward the lower core layer in the track width direction, (e) removing the resist layer, (f) etching the primary insulating layer exposed between the sloping faces by a reactive ion etching process to form a groove defining a track width in the primary insulating layer, (g) forming a magnetic gap layer on one of the lower core layer and a lower magnetic pole layer which is optionally formed on the lower core layer in the groove, and (h) forming an optional upper magnetic pole layer on the magnetic gap layer within the groove and then forming an upper core layer on one the upper magnetic pole layer and the magnetic gap layer.

As described above, the primary insulating layer and the auxiliary insulating layer are formed on the lower core layer. The resist layer having the gap is formed on the auxiliary insulating layer by patterning. The width of the gap in the resist layer significantly depends on the wavelength of light used in an exposure and developing process. For example, when i-line light (wavelength is 365 nm) is used, the gap can be reduced to approximately 0.4 μm.

However, a gap having a width of less than 0.4 μm cannot be formed using the i-line light. In a conventional method shown in FIG. 14 for defining the track width $T_w$ by ion milling transfer of the gap formed in the resist layer to the groove formed in the insulating layer, a track width $T_w$ which is smaller than 0.4 μm is not formed using the i-line light.

In the present invention, a resist layer having a gap with a predetermined width is formed on the auxiliary insulating layer. The auxiliary insulating layer exposed in the gap is etched by an ion milling process in the step (d). The etching forms sloping faces which converge in the track width direction toward the lower core layer, at both sides of the groove formed by the etching.

Thus, the bottom width of the groove in the auxiliary insulating layer is smaller than the gap width of the resist layer. When the gap width of the resist layer is, for example, 0.4 μm which corresponds to the resolution of the i-line light, the bottom width of the groove in the auxiliary insulating layer is smaller than 0.4 μm.

According to the method of the present invention, the groove formed in the auxiliary insulating layer can have a bottom width which is smaller than the resolution of the i-line light.

In the step (f) of the method according to the present invention, the primary insulating layer is etched substantially in the vertical direction by the reactive ion etching process so as to form a groove having a width which is the same as the bottom width of the groove in the auxiliary insulating layer. The width of the groove formed in the primary insulating layer is defined as the track width $T_w$. The etching rate of the insulating material used for the primary insulating layer is larger than the etching rate of the insulating material for the auxiliary insulating layer. The bottom width of the groove in the auxiliary insulating layer is smaller than the resolution of the light used in the exposure and developing process for the resist. Consequently, the width for defining the track width $T_w$ of the groove in the primary insulating layer is smaller than the resolution. Thus, the track width $T_w$ in the present invention is smaller than the resolution. Accordingly the thin-film magnetic head is suitable for future narrower tracks required for higher recording densities.

In the step (c), the resist layer is preferably formed on the auxiliary insulating layer so that the thickness of the resist layer is in a range of one to three times the width of the groove. The sloping faces of the auxiliary insulating layer thereby have a desired shape which can effectively prevent write fringing.

Preferably, in the step (c), the resist layer is exposed and developed to form the gap, and is then heated to form the sloping faces converging toward the lower core layer in the track width direction at both sides of the gap.

Alternatively, the above method for making a thin-film magnetic head further includes the steps of, instead of the steps (b) to (e):

(i) forming a lift-off resist layer having indented sections at the bottom thereof on the primary insulating layer, (j) depositing an auxiliary insulating layer in the indented sections of the resist layer and on the primary insulating layer by a sputtering process using an insulating material having an etching rate which is lower than the etching rate of an insulating material for the primary insulating layer in reactive ion etching, and simultaneously forming sloping faces to form sloping faces converging toward the lower core layer in the track width direction, and (k) removing the resist layer.

As described above, the resolution of the i-line light in the exposure and developing process for the lift-off resist layer is 0.4 μm. Thus, the width of the top face of the lift-off resist layer on the primary insulating layer is at least 0.4 μm.

However, the lower portions of the lift-off resist layer are eroded during the exposure and developing process and indented sections are formed at the lower portions. Thus, the bottom width of the lift-off resist layer is smaller than the resolution.

The auxiliary insulating layer is formed by a sputtering or ion beam sputtering process in oblique directions so that the auxiliary insulating layer extends to the interior of the indented sections. As a result, the auxiliary insulating layer has a gap width which is smaller than the resolution.

In the subsequent step (f), the groove for defining the track width $T_w$ which is smaller than the resolution can be formed in the primary insulating layer. Preferably, the primary insulating layer is formed of at least one insulating material selected from the group consisting of $Al_2O_3$, $SiO_2$, $Ta_2O_5$, TiO, AlN, AlSiN, TiN, SiN, NiO, WO, $WO_3$, BN, CrN, and SiON. Preferably the auxiliary insulating layer is formed of at least one insulating material selected from the group consisting of $Al_2O_3$, $Si_3N_4$, AlN, and SiON. In this combination, the etching rate of the primary insulating layer is larger than the etching rate of the auxiliary insulating layer.

Preferably, the etching rate of the insulating material for the primary insulating layer is at least ten times higher than the etching rate of the insulating material for the auxiliary insulating layer. In order to satisfy this condition, it is preferable that the primary insulating layer be formed of at least one of $SiO_2$ and SiON and the auxiliary insulating layer be formed of at least one of $Al_2O_3$ and $Si_3N_4$.

In this case, the primary insulating layer is selectively etched in the reactive ion etching process for forming the groove for defining the track width in the primary insulating layer, while the auxiliary insulating layer is not substantially etched. As a result, the groove for defining the track width can be formed in the primary insulating layer so that the width of the groove is substantially the same as the bottom width of the groove in the auxiliary insulating layer. This small track width $T_w$ is suitable for narrower tracks.

DESCRIPTION OF THE PREFERRED EMBODIMENTS

Figure 1:
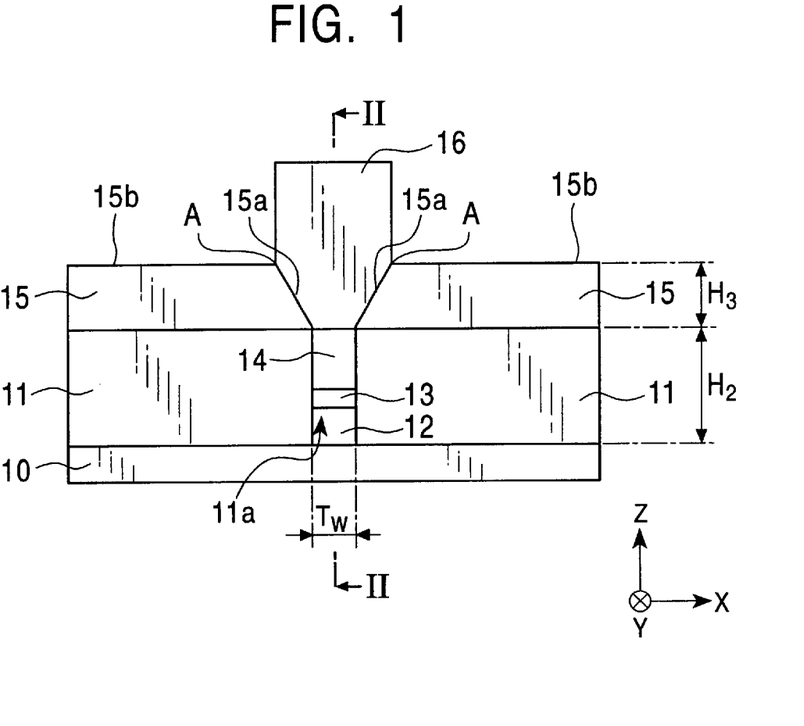
FIG. 1 is a partial front view of a thin-film magnetic head (inductive head) viewed from a face, the air bearing surface (ABS), opposing a recording medium according to a first embodiment of the present invention.
Figure 2:
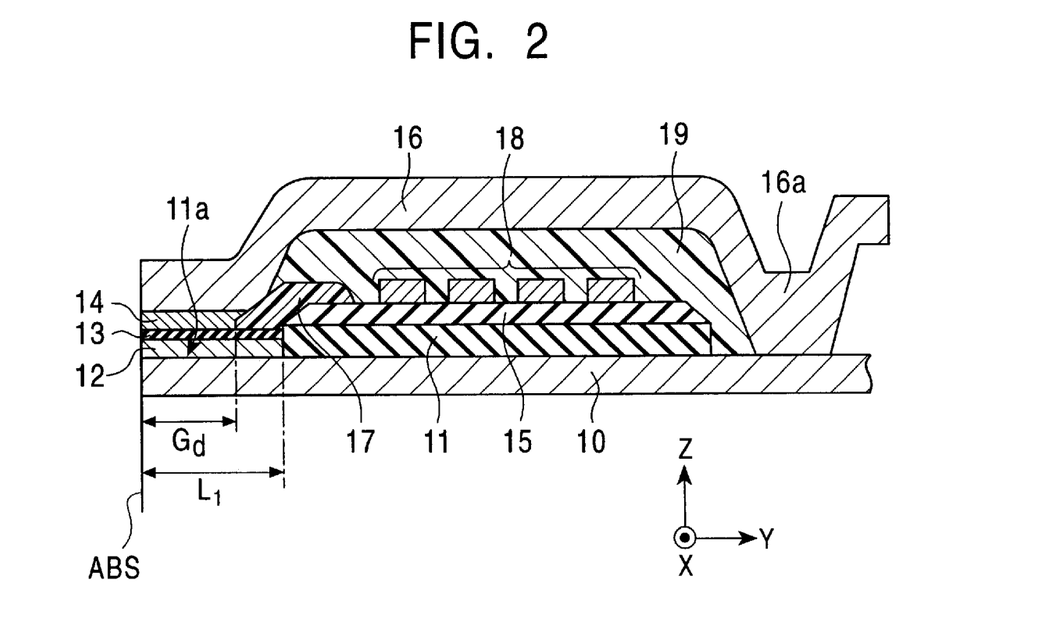
FIG. 2 is a partial cross-sectional view of the thin-film magnetic head taken along line II—II in FIG. 1 and viewed from the direction of arrows in FIG. 1.

FIG. 1 is a partial front view of a thin-film magnetic head according to a first embodiment of the present invention. FIG. 2 is a partial cross-sectional view taken along line II—II in FIG. 1 and viewed from the direction of arrows in FIG. 1. This thin-film magnetic head is an inductive write head and is deposited on a magnetoresistive read head.

The read head includes a magnetoresistive element, for example a GMR element having a giant magnetoresistive effect, such as a spin-valve film, or an AMR element having an anisotropic magnetoresistive effect. Shielding layers are formed above and below the magnetoresistive element with magnetic gap layers provided therebetween.

With reference to FIGS. 1 and 2, the thin-film magnetic head has a lower core layer 10 formed of a soft magnetic material having high permeability, such as an Fe-Ni alloy (permalloy).

In the present invention, a primary insulating layer 11 is formed on the lower core layer 10. The primary insulating layer 11 is preferably formed of at least one insulating material selected from the group consisting of $Al_2O_3$, $SiO_2$, $Ta_2O_5$, TiO, AlN, AlSiN, TiN, SiN, NiO, WO, $WO_3$, BN, CrN, and SiON. The primary insulating layer 11 may have a single-layer configuration or a multi-layer configuration. As shown in FIG. 1, the primary insulating layer 11 preferably has a thickness $H_2$ in a range of approximately 1.0 μm to 3.0 μm.

In the present invention, an auxiliary insulating layer 15 is formed on the primary insulating layer 11. The auxiliary insulating layer 15 preferably has a thickness $H_3$ which is less than the thickness $H_2$ of the primary insulating layer 11. For example, the primary insulating layer 11 has a thickness $H_2$ of approximately 1.5 μm, whereas the auxiliary insulating layer 15 has a thickness $H_3$ of approximately 0.7 μm. The auxiliary insulating layer 15 may have a single-layer configuration or a multi-layer configuration.

The material for the auxiliary insulating layer 15 may be selected from the above-described insulating materials for the primary insulating layer 11. When the thin-film magnetic head is produced by a reactive ion etching process, the etching rate of the primary insulating layer 11 must be higher than the etching rate of the auxiliary insulating layer 15. In order to satisfy such a condition, it is preferable that the primary insulating layer 11 be formed of at least one of the above-described insulating materials and the auxiliary insulating layer 15 be formed of at least one insulating material selected from the group consisting of $Al_2O_3$, $Si_3N_4$, AlN, and SiON.

It is preferable that the etching rate of the primary insulating layer 11 be at least ten times higher than the etching rate of the auxiliary insulating layer 15. In order to satisfy such an etching rate ratio, it is preferable that the primary insulating layer 11 be formed of $SiO_2$ and/or SiON and the auxiliary insulating layer 15 be formed of $Al_2O_3$ and/or $Si_3N_4$.

When the primary insulating layer 11 is formed of $SiO_2$ and the auxiliary insulating layer 15 is formed of $Al_2O_3$ and when $C_3F_8^+$ (Ar) gas is used in the reactive ion etching process, the etching rate of the primary insulating layer 11 is approximately 15 times higher than the etching rate of the auxiliary insulating layer 15.

Also, when the primary insulating layer 11 is formed of $SiO_2$ and the auxiliary insulating layer 15 is formed of $Si_3N_4$ and when $C_3F_8^+$ (Ar) gas is used in the reactive ion etching process, the etching rate of the primary insulating layer 11 is approximately 15 times higher than the etching rate of the auxiliary insulating layer 15.

When the etching rate of the primary insulating layer 11 is higher than the etching rate of the auxiliary insulating layer 15 in the reactive ion etching process, the track width can be reduced to a desired level in the subsequent production steps.

The primary insulating layer 11 on the lower core layer 10 has a groove 11a defining a track width $T_w$. As shown in FIG. 2, the groove 11a has a length $L_1$ and extends from a face, air bearing surface (ABS), opposing a recording medium in the height direction (Y direction in the drawing).

A lower magnetic pole layer 12 is formed in the groove 11a and is magnetically coupled with the lower core layer 10. A magnetic gap layer 13 composed of a nonmagnetic metal is formed on the lower magnetic pole layer 12. An upper magnetic pole layer 14 is formed on the magnetic gap layer 13 by a plating process and is magnetically coupled with an upper core layer 16. The lower magnetic pole layer 12 is magnetically coupled with the lower core layer 10 and the upper magnetic pole layer 14 is magnetically coupled with the upper core layer 16.

Any other layer configuration may be employed in the groove 11a of the primary insulating layer 11. For example, the lower magnetic pole layer 12 for the lower core layer 10 may be omitted in the present invention. In this case, the lower face of the magnetic gap layer 13 is in contact with the lower core layer 10. Also the upper magnetic pole layer 14 for the upper core layer 16 may be omitted in the present invention. In this case, the upper face of the magnetic gap layer 13 is in contact with the upper core layer 16.

It is preferable in order to further improve recording efficiency that the upper magnetic pole layer 14 and the lower magnetic pole layer 12 have saturated magnetic flux densities which are higher than those of the lower core layer 16 and the upper core layer 10, respectively.

Since the groove 11a in the primary insulating layer 11 has a width corresponding to the track width $T_w$, the width of the fringing magnetic field generated between the lower magnetic pole layer 12 and the upper magnetic pole layer 14 in the groove 11a is also controlled to be within the track width $T_w$. Thus, recording characteristics can be maintained at satisfactory levels.

In the present invention, the width of the groove 11a, that is, the track width $T_w$, can be controlled to be a level which is higher than the resolution of a resist by a production method described below. Specifically, the track width $T_w$ can be controlled to be preferably not more than 0.7 μm, more preferably not more than 0.5 μm, and most preferably not more than 0.3 μm. Thus, the resulting thin-film magnetic head is suitable for future higher recording densities.

With reference to FIG. 1, the auxiliary insulating layer 15 has sloping faces 15a diverging from the top end of the groove 11a toward surfaces 15b. The upper core layer 16 is formed over the upper magnetic pole layer 14 and the sloping faces 15a of the auxiliary insulating layer 15 by a frame plating process or the like. It is preferable that the upper core layer 16 extend to boundaries A between the sloping faces 15a and the surfaces 15b of the auxiliary insulating layer 15, as shown in FIG. 1, in order to increase the width of the upper core layer 16. An increased width of the upper core layer 16 can prevent magnetic saturation at future higher recording densities.

When the upper magnetic pole layer 14 is under the upper core layer 16, the upper magnetic pole layer 14 may be provided not only in the groove 11a but also on the sloping faces 15a. It is not necessary that the surface of the upper magnetic pole layer 14 and the surface of the primary insulating layer 11 are in the same level. For example, the surface of the upper magnetic pole layer 14 may be lower than the surface of the primary insulating layer 11. In this case, a part of the upper core layer 16 lies in the groove 11a.

In the present invention, the lower core layer 16 and the optional upper magnetic pole layer 14 are formed on the sloping faces 15a. Thus, the upper core layer 16 and the upper magnetic pole layer 14 are properly distant from the lower magnetic pole layer 12 formed under the magnetic gap layer 13. This configuration can effectively prevent write fringing.

In the embodiment shown in FIGS. 1 and 2, the sloping faces 15a are formed by etching the auxiliary insulating layer 15 and are substantially planar. The production method of the present invention which will be described below includes a step for etching the auxiliary insulating layer 15 in oblique directions so that the sloping faces 15a are substantially symmetrically formed and have substantially the same tilt angle.

In the present invention, as shown in FIG. 2, a predetermined gap ($G_d$) is provided on the magnetic gap layer 13 in the groove 11a of the primary insulating layer 11 extending from the face (ABS) opposing the recording medium in the height direction (Y direction in the drawing). A $G_d$-defining insulating layer 17 is formed over the magnetic gap layer 13 and the auxiliary insulating layer 15 behind the gap. The $G_d$-defining insulating layer 17 is formed of, for example, an organic resin material such as polyimide or a resist material.

The $G_d$-defining insulating layer 17 is provided on the magnetic gap layer 13 to determine the gap depth $G_d$. Since the gap depth $G_d$ significantly affects electrical characteristics of the thin-film magnetic head, it must have a proper size. Alternatively, the length $L_1$ of the groove 11a of the primary insulating layer 11 is used as the gap depth $G_d$. In this case, the $G_d$-defining insulating layer 17 is unnecessary.

Figure 3:
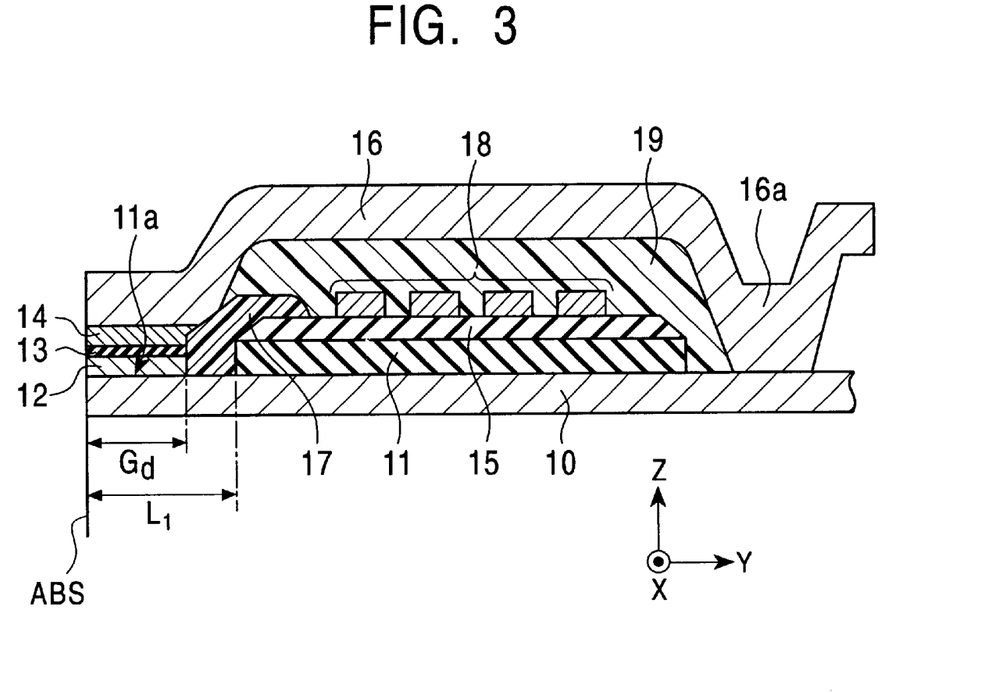
FIG. 3 is a partial cross-sectional view of a thin-film magnetic head according to a second embodiment of the present invention.

With reference to FIG. 3, in a second embodiment of the present invention, the $G_d$-defining insulating layer 17 is formed on the lower core layer 10 and then the lower magnetic pole layer 12, the magnetic gap layer 13, and the upper magnetic pole layer 14 are consecutively formed thereon.

With reference to FIG. 2 again, a spiral coil layer 18 is directly formed by patterning on the auxiliary insulating layer 15. The $G_d$-defining insulating layer 17 may be formed between the coil layer 18 and the auxiliary insulating layer 15. A coil insulating layer 19 covers the coil layer 18. The coil insulating layer 19 is formed of an organic resin material, such as a resist material or polyimide.

The upper core layer 16 extends from the face (ABS) opposing the recording medium in the height direction. A base section 16a of the upper core layer 16 is magnetically coupled with the lower core layer 10.

In the thin-film magnetic head shown in FIGS. 1 to 3, a recording current flowing in the coil layer 18 induces a recording magnetic field in the lower core layer 10 and the upper core layer 16. The recording magnetic field generates a fringing magnetic field between the lower magnetic pole layer 12 and the upper magnetic pole layer 14, which are separated by the magnetic gap layer 13. The fringing magnetic field records a magnetic signal on a recording medium such as a hard disk.

As described above, according to the present invention, the groove 11a having a width of not more than 0.7 µm, which corresponds to the track width $T_w$, is formed at least in the primary insulating layer 11 on the lower core layer 10, and the lower magnetic pole layer 12, the magnetic gap layer 13, and the upper magnetic pole layer 14 are formed, in that order, in the groove 11a. Thus, the fringing magnetic field can be generated within the track width $T_w$ between the lower magnetic pole layer 12 and the upper magnetic pole layer 14. The resulting thin-film magnetic head is suitable for future higher recording densities.

In the present invention, the width of the groove 11a for defining the track width in the primary insulating layer 11 is smaller than the resolution of the resist.

Moreover, the sloping faces 15a gradually converge toward both top edges of the groove 11a of the primary insulating layer 11 to the surfaces 15b of the auxiliary insulating layer 15 in the track width direction (X direction in the drawing). The upper magnetic pole layer 14 and/or the upper core layer 16 magnetically coupled with the upper magnetic pole layer 14 are formed on the sloping faces 15a. Thus, the fringing magnetic field is substantially generated between the upper core layer 16 and the lower magnetic pole layer 12 and/or between the upper magnetic pole layer 14 and the lower magnetic pole layer 12. Accordingly, write fringing is effectively prevented.

Since the sloping faces 15a can be formed on the auxiliary insulating layer 15 by a method described below, the sloping faces 15a are substantially symmetrically arranged even when the track width is smaller. Thus, write fringing can be more effectively prevented.

Figure 4:
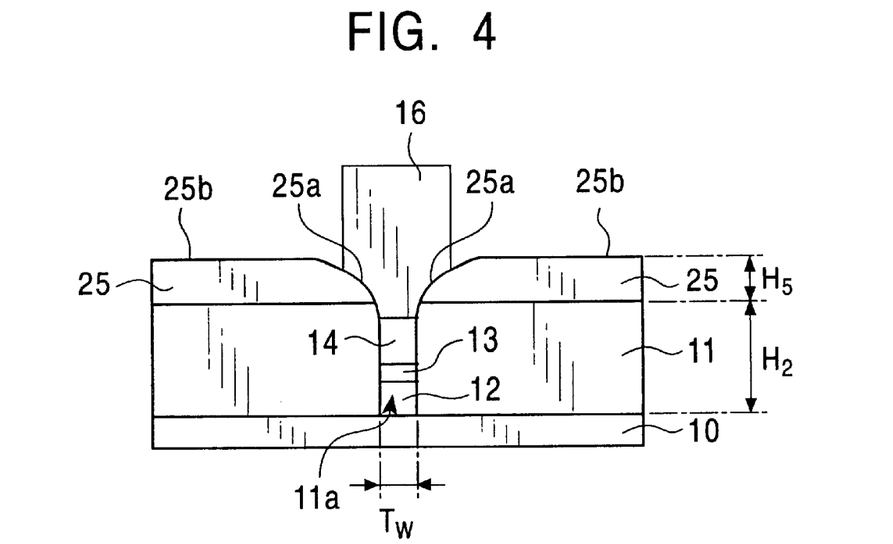
FIG. 4 is a partial front view of a thin-film magnetic head according to a third embodiment of the present invention viewed from a face, the air bearing surface (ABS), opposing a recording medium.

FIG. 4 is a partial front view of a third embodiment of the thin-film magnetic head of the present invention. This thin-film magnetic head has the same configuration as that shown in FIG. 2.

This thin-film magnetic head also has a lower core layer 10 formed of a soft magnetic material having high permeability, such as an Fe—Ni alloy (permalloy). A primary insulating layer 11 is formed on the lower core layer 10. The primary insulating layer 11 has a groove 11a defining a track width $T_w$.

The primary insulating layer 11 is preferably formed of at least one insulating material selected from the group consisting of $Al_2O_3$, $SiO_2$, $Ta_2O_5$, TiO, AlN, AlSiN, TiN, SiN, NiO, WO, $WO_3$, BN, CrN, and SiON. The primary insulating layer 11 may have a single-layer configuration or a multi-layer configuration. As shown in FIG. 4, the primary insulating layer 11 preferably has a thickness $H_2$ in a range of approximately 1.0 µm to 3.0 µm.

A lower magnetic pole layer 12 is formed on the lower core layer 10 in the groove 11a. A magnetic gap layer 13 composed of a nonmagnetic metallic material is formed on the lower magnetic pole layer 12. An upper magnetic pole layer 14 is formed on the magnetic gap layer 13 by a plating process. The upper magnetic pole layer 14 is magnetically coupled with an upper core layer 16 formed thereon. The lower magnetic pole layer 12 is magnetically coupled with the lower core layer 10 and the upper magnetic pole layer 14 is magnetically coupled with the upper core layer 16.

Any other layer configuration may be employed in the groove 11a of the primary insulating layer 11. For example, the lower magnetic pole layer 12 for the lower core layer 10 may be omitted in the present invention. In this case, the lower face of the magnetic gap layer 13 is in contact with the lower core layer 10. Also the upper magnetic pole layer 14 for the upper core layer 16 may be omitted in the present invention. In this case, the upper face of the magnetic gap layer 13 is in contact with the upper core layer 16.

It is preferable in order to further improve recording efficiency that the upper magnetic pole layer 14 and the lower magnetic pole layer 12 have saturated magnetic flux densities which are higher than those of the upper core layer 16 and the lower core layer 10, respectively.

As shown in FIG. 4, an auxiliary insulating layer 25 is formed on the primary insulating layer 11. The auxiliary insulating layer 25 preferably has a thickness $H_5$ which is less than the thickness $H_2$ of the primary insulating layer 11. For example, the primary insulating layer 11 has a thickness $H_2$ of approximately 1.5 µm, whereas the auxiliary insulating layer 25 has a thickness $H_5$ of approximately 0.7 µm. The auxiliary insulating layer 25 may have a single-layer configuration or a multi-layer configuration.

The material for the auxiliary insulating layer 25 may be selected from the above-described insulating materials for the primary insulating layer 11. When the thin-film magnetic head is produced by a reactive ion etching process, the etching rate of the primary insulating layer 11 must be higher than the etching rate of the auxiliary insulating layer 25. In order to satisfy such a condition, it is preferable that the primary insulating layer 11 be formed of at least one of the above-described insulating materials and the auxiliary insulating layer 25 be formed of at least one insulating material selected from the group consisting of $Al_2O_3$, $Si_3N_4$, AlN, and SiON.

It is preferable that the etching rate of the primary insulating layer 11 be at least ten times higher than the etching rate of the auxiliary insulating layer 25. In order to satisfy such an etching rate ratio, it is preferable that the primary insulating layer 11 be formed of $SiO_2$ and/or SiON and the auxiliary insulating layer 25 be formed of $Al_2O_3$ and/or $Si_3N_4$.

When the primary insulating layer 11 is formed of $SiO_2$ and the auxiliary insulating layer 25 is formed of $Al_2O_3$ and when $C_3F_8^+$ (Ar) gas is used in the reactive ion etching process, the etching rate of the primary insulating layer 11 is approximately 15 times higher than the etching rate of the auxiliary insulating layer 25.

Also, when the primary insulating layer 11 is formed of $SiO_2$ and the auxiliary insulating layer 25 is formed of $Si_3N_4$ and when $C_3F_8^+$ (Ar) gas is used in the reactive ion etching process, the etching rate of the primary insulating layer 11 is approximately 15 times higher than the etching rate of the auxiliary insulating layer 25.

When the etching rate of the primary insulating layer 11 is higher than the etching rate of the auxiliary insulating layer 25 in the reactive ion etching process, the track width can be reduced to a desired level in the subsequent production steps.

The auxiliary insulating layer 25 has convex sloping faces 25a which gradually converge toward both top edges of the groove 11a in the track width direction. The upper core layer 16 is formed over the upper magnetic pole layer 14 and the sloping faces 25a of the auxiliary insulating layer 25 by a frame plating process or the like.

The thin-film magnetic head shown in FIG. 4 is produced by a method which is different from the method for the embodiment shown in FIG. 1. As shown in FIG. 4, the shape of the sloping faces 25a of the auxiliary insulating layer 25 is different from the shape of the sloping faces 15a of the auxiliary insulating layer 15 shown in FIG. 1.

The sloping faces 25a shown in FIG. 4 are formed by forming the auxiliary insulating layer 25 by a sputtering or ion beam sputtering process, and are convex. These convex sloping faces 25a can be formed by a method described below so that the convex sloping faces 25 are symmetrically arranged.

Also in this embodiment, the groove 11a having a width of not more than 0.7 µm, which corresponds to the track width $T_w$, is formed in the primary insulating layer 11. The lower magnetic pole layer 12, the magnetic gap layer 13, and the upper magnetic pole layer 14 are formed, in that order, in the groove 11a. Thus, the fringing magnetic field can be generated within the track width $T_w$ between the lower magnetic pole layer 12 and the upper magnetic pole layer 14. The resulting thin-film magnetic head is suitable for future higher recording densities. The width of the groove 11a defining the track width is more preferably not more than 0.5 µm and most preferably not more than 0.3 µm.

According to the method described below, the groove 11a for defining the track width can be formed in the primary insulating layer 11 so that the width of the groove 11a is smaller than the resolution of the resist.

Moreover, the convex sloping faces 25a gradually converge toward both top edges of the groove 11a of the primary insulating layer 11 in the track width direction (X direction in the drawing). The upper magnetic pole layer 14 and/or the upper core layer 16 magnetically coupled with the upper magnetic pole layer 14 are formed on the convex sloping faces 25a. Thus, the fringing magnetic field is substantially generated between the upper core layer 16 and the lower magnetic pole layer 12 and/or between the upper magnetic pole layer 14 and the lower magnetic pole layer 12. Accordingly, write fringing is effectively prevented.

With reference to FIGS. 5 to 8, the method for making the thin-film magnetic head of the present invention shown in FIG. 1 will be described. FIGS. 5 to 8 are partial front views of the thin-film magnetic head viewed from the face (ABS) opposing the recording medium in individual production steps.

Figure 5:
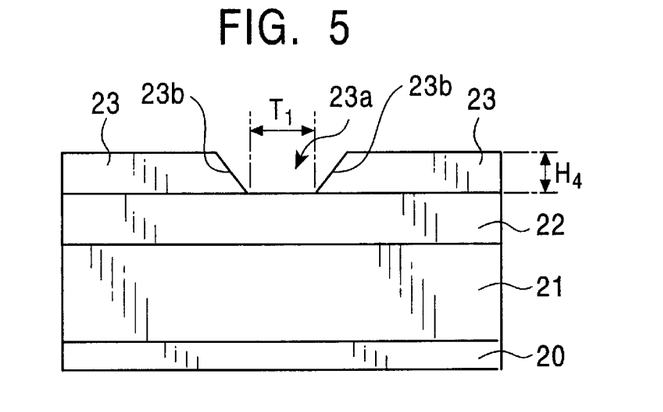
FIG. 5 is a partial front view showing the layers for making the thin-film magnetic head shown in FIG. 1.

In the step shown in FIG. 5, a primary insulating layer 21 is formed on a lower core layer 20 and an auxiliary insulating layer 22 is formed on the primary insulating layer 21. It is preferable that the thickness of the auxiliary insulating layer 22 be less than the thickness of the primary insulating layer 21, as shown in FIG. 5. For example, the primary insulating layer 21 has a thickness of approximately 1.5 µm, whereas the auxiliary insulating layer 22 has a thickness of approximately 0.7 µm.

In the present invention, an insulating material for the auxiliary insulating layer 22 has an etching rate in reactive ion etching which is smaller than that of an insulating material for the primary insulating layer 21. Controlling the etching rates of these insulating materials facilitates the formation of a groove defining a track width with a predetermined shape in the primary insulating layer 21 during a subsequent step.

It is preferable that the primary insulating layer 21 be formed of at least one insulating material selected from the group consisting of $Al_2O_3$, $SiO_2$, $Ta_2O_5$, TiO, AlN, AlSiN, TiN, SiN, NiO, WO, $WO_3$, BN, CrN, and SiON, and the auxiliary insulating layer 22 be formed of at least one insulating material selected from the group consisting of $Al_2O_3$, $Si_3N_4$, AlN, and SiON. In this combination, the etching rate of the primary insulating layer 21 is higher than the etching rate of the auxiliary insulating layer 22.

It is preferable that the etching rate of the primary insulating layer 21 be at least ten times higher than the etching rate of the auxiliary insulating layer 22. In order to satisfy such an etching rate ratio, it is preferable that the primary insulating layer 21 be formed of $SiO_2$ and/or SiON and the auxiliary insulating layer 22 be formed of $Al_2O_3$ and/or $Si_3N_4$.

As shown in FIG. 5, a resist layer 23 is formed on the auxiliary insulating layer 22. The resist layer 23 has a predetermined gap 23a which is formed by patterning. Preferably, the width $T_1$ of the gap 23a is as small as possible. In particular, the width $T_1$ of the resist layer 23 is preferably formed by the highest resolution of the exposure and developing process. This resolution significantly depends on the wavelength used. For example, when i-line light is used, the resolution is approximately 0.4 µm. Thus, the width $T_1$ when i-line light is used is preferably 0.4 µm.

As shown in FIG. 5, at both sides of the gap 23a formed in the resist layer 23 by the patterning process, sloping faces 23b which gradually converge toward the bottom side in the track width direction (in the X direction in the drawing) are preferably formed.

These sloping faces 23b are used for forming sloping faces having a predetermined shape in the auxiliary insulating layer 22 during the next step. The sloping faces 23b are formed by providing the gap 23a by the patterning process and then heating (post-baking) the gap 23a so that both sides of the gap 23a sag. It is preferable that the two sloping faces 23b have substantially the same tilt angle. The tilt angle of the sloping faces 23b can be determined by the heating temperature. These sloping faces 23b can suppress the shadow effect during the ion milling process.

The resist layer 23 has a thickness $H_4$ which is smaller than the thickness $H_1$ of the resist layer 8 used in the conventional method shown in FIG. 15. Since the thickness $H_4$ of the resist layer 23 is small, focusing can readily occur in the exposure and developing process and a predetermined pattern can be readily formed in the resist layer 23.

In the present invention, it is preferable that the thickness $H_4$ of the resist layer 23 be in a range of one to three times the width of a groove for defining the track width which will be formed in a subsequent step, as described below.

Figure 6:
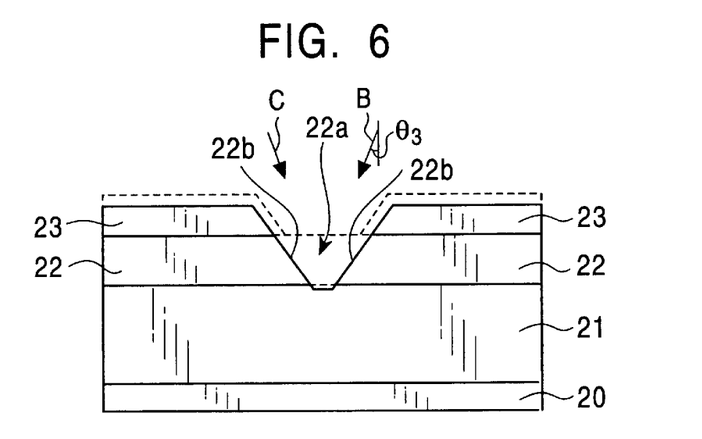
FIG. 6 is a partial front view of showing the formation of the groove in the auxiliary insulating layer of the thin-film magnetic head, shown in FIG. 1.

With reference to FIG. 6, the auxiliary insulating layer 22 exposed by the gap 23a is obliquely etched by an ion milling process to form a groove 22a in the auxiliary insulating layer 22. The groove 22a has sloping faces 22b continuing from the sloping faces 23b of the resist layer 23. During the ion milling process, the surfaces of the resist layer 23 are also etched, as shown by dotted lines in FIG. 6.

Since the formed groove 22a reaches the primary insulating layer 21, the primary insulating layer 21 is exposed by the groove 22a and the exposed primary insulating layer 21 is also slightly etched during the ion milling process, as shown by a dotted line in FIG. 6.

The sloping faces 22b of the auxiliary insulating layer 22 are used for suppressing write fringing. The upper core layer 16 and the upper magnetic pole layer 14 shown in FIG. 1 are formed on the sloping faces 22b.

As described above, the thickness $H_4$ of the resist layer 23 is in a range of one to three times the width of the groove for defining the track width which will be formed in a subsequent step, as described below. In this case, even if ions are not uniformly distributed in the ion milling process, for example, even if the incident angle of ions in the direction shown by the arrow B and the incident angle of ions in the direction shown by the arrow C are different from each other, the amounts of ions incident on the gap 23a are not significantly different between the direction B and the direction C. Thus, the auxiliary insulating layer 22 exposed by the gap 23a can be uniformly etched so that the sloping faces 22b are substantially symmetrically arranged and gradually converge toward the bottom in the track width direction.

If the thickness $H_4$ of the resist layer 23 is thick, as in conventional methods, or if the ion distribution is uneven, the amount of ions incident on the gap 23a of the resist layer 23 significantly depends on the incident angle. As a result, the sloping faces 22b formed in the auxiliary insulating layer 22 are not formed symmetrically.

It is preferable that the incident angle $\theta_3$ of ions during the ion milling process be in a range of approximately 20° to 60°. In this range, the auxiliary insulating layer 22 exposed through the mask can be securely irradiated with ions, and is barely contaminated with species formed during the ion milling process.

The sloping faces 22b of the auxiliary insulating layer 22 are formed by ion irradiation from the oblique direction and have substantially flat surfaces, as shown in FIG. 6.

Figure 7:
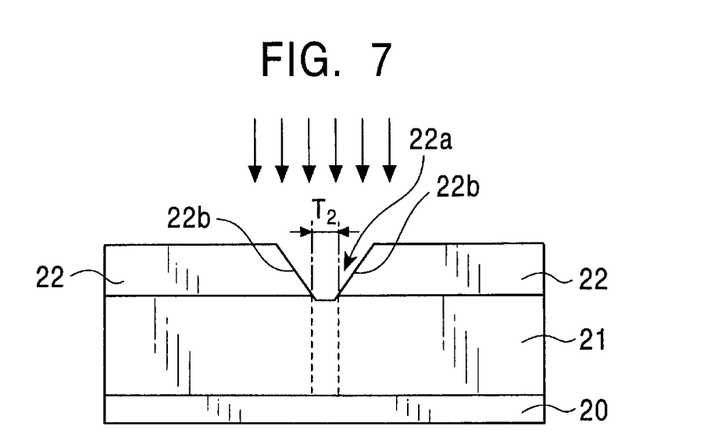
FIG. 7 is a partial front view showing the removal of the resist layer of the thin-film magnetic head shown in FIG. 1.

With reference to FIG. 7, the resist layer 23 is removed. The bottom of the groove 22a in the auxiliary insulating layer 22 has a width $T_2$ which is smaller than the width $T_1$ of the gap 23a in the resist layer 23 shown in FIG. 5. When the width $T_1$ of the gap 23a is formed at the maximum resolution in the exposure and developing process, the width $T_2$ of the bottom of the groove 22a is smaller than the maximum resolution.

Figure 8:
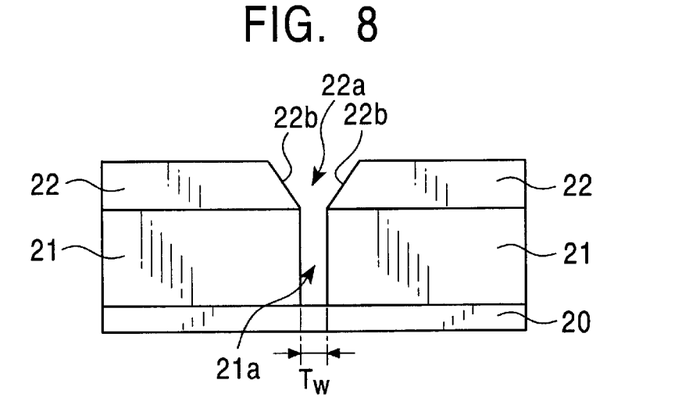
FIG. 8 is a partial front view showing the formation of the groove in the primary insulating layer of the thin-film magnetic head shown in FIG. 1.

With reference to FIG. 8, a groove 21a defining the track width is formed in the primary insulating layer 21 by a reactive ion etching (RIE) process. As described above, the etching rate of the material for the primary insulating layer 21 is higher than the etching rate of the material for the auxiliary insulating layer 22. It is preferable that the etching rate of the primary insulating layer 21 be at least ten times higher than the etching rate of the auxiliary insulating layer 22. In this case, the primary insulating layer 21 can be selectively etched while the auxiliary insulating layer 22 is not substantially etched in the RIE process. That is, the auxiliary insulating layer 22 functions as a mask for the RIE process and thus the primary insulating layer 21 exposed at the groove 22a is selectively etched.

The groove 21a formed in such a manner passes through the primary insulating layer 21 to the surface of the lower core layer 20.

As described above, the bottom width $T_2$ of the groove 22a is smaller than the resolution of the resist. Moreover, the auxiliary insulating layer 22 functions as a mask during the reactive ion etching process so as to selectively etch the exposed primary insulating layer 21 as shown in FIG. 7. Thus, the groove 21a for defining the track width is formed in the primary insulating layer 21 and also has a width which is smaller than the resolution of the resist.

Since the width of the groove 21a is defined as the track width $T_w$, the track width $T_w$ is smaller than the resolution of the resist layer. Thus, the thin-film magnetic head is suitable for future smaller tracks which are required for higher recording densities.

Since the sloping faces 22b formed on the auxiliary insulating layer 22 are substantially symmetrically formed and gradually converge toward the bottom in the track width direction, these faces can effectively suppress write fringing.

In the present invention, a lower magnetic pole layer and a magnetic gap layer are formed, in that order, on the lower core layer 20 in the groove 21a. Alternatively, a magnetic gap layer and an upper magnetic pole layer are formed, in that order, on the lower core layer 20 in the groove 21a. Alternatively, a lower magnetic pole layer, a magnetic gap layer, and an upper magnetic pole layer are formed in that order in the groove 21a. Moreover, an upper core layer is formed over the topmost layer in the groove 21a and the sloping faces 22b of the auxiliary insulating layer 22 by a frame plating process.

With reference to FIGS. 9 to 12, a method for making the thin-film magnetic head of the present invention shown in FIG. 4 will be described. FIGS. 9 to 12 a re partial front views of the thin-film magnetic head in individual steps, viewed from the face (ABS) opposing the recording medium.

Figure 9:
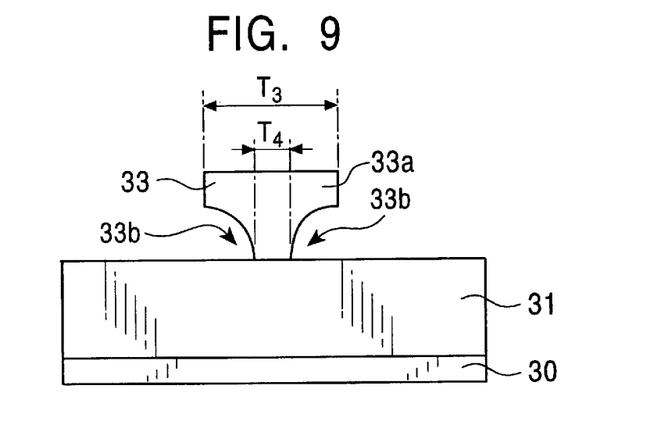
FIG. 9 is a partial front view showing the layers for making the thin-film magnetic head shown in FIG. 4.

With reference to FIG. 9, a primary insulating layer 31 is formed on a lower core layer 30. A lift-off resist layer 33 is formed on the primary insulating layer 31. The primary insulating layer 31 has a thickness of, for example, approximately 1.5 μm.

In the present invention, the primary insulating layer 31 is preferably formed of at least one insulating material selected from the group consisting of $Al_2O_3$, $SiO_2$, $Ta_2O_5$, TiO, AlN, AlSiN, TiN, SiN, NiO, WO, $WO_3$, BN, CrN, and SiON. These insulating materials have etching rates which are higher than those of insulating materials used for an auxiliary insulating layer 32 described below.

In FIG. 9, the lift-off resist layer 33 is formed on the primary insulating layer 31. The lift-off resist layer 33 is used for forming the auxiliary insulating layer 32 in the subsequent step so that the auxiliary insulating layer 32 is disposed with a gap which is smaller than the resolution of the lift-off resist layer 33 in the exposure and development process.

With reference to FIG. 9, the top face 33a of the liftoff resist layer 33 has a width $T_3$. The width $T_3$ will not be smaller than the resolution of the lift-off resist layer 33 in the exposure and development process. For example, when i-line light is used, the resolution is approximately 0.4 μm. Thus, the lower limit of the width $T_3$ of the top face 33a of the lift-off resist layer 33 is approximately 0.4 μm.

The lower portion of the lift-off resist layer 33 is dissolved by a developing solution to form indented sections 33b, as shown in FIG. 9. That is, the bottom width $T_4$ of the lift-off resist layer 33 is smaller than the top width $T_3$ due to the indented sections 33b, and is smaller than the resolution of the exposure and developing process.

Figure 10:
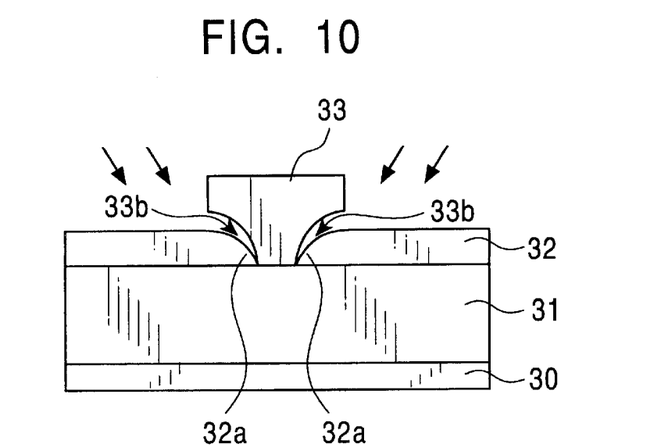
FIG. 10 is a partial front view showing the formation of additional layers for making the thin-film magnetic head shown in FIG. 4.

With reference to FIG. 10, the auxiliary insulating layer 32 is formed on the primary insulating layer 31 by a sputtering process so that the auxiliary insulating layer 32 extends to the interior of the indented sections 33b. Thus, the primary insulating layer 31 is irradiated with ion beams in the oblique directions. Preferable sputtering processes include an ion beam sputtering process, a long-throw sputtering process, and a collimated sputtering process.

In this process, convex sloping faces 32a extending from the bottom edges of the lift-off resist layer 33 toward the upper portions are formed on the auxiliary insulating layer 32.

In this embodiment, the etching rate of the auxiliary insulating layer 32 is smaller than the etching rate of the primary insulating layer 31. In order to satisfy this condition, the auxiliary insulating layer 32 is preferably formed of at least one insulating material selected from $Al_2O_3$, $Si_3N_4$, AlN, and SiON.

It is preferable that the etching rate of the insulating material used for the primary insulating layer 31 be at least ten times higher than the etching rate of the insulating material used for the auxiliary insulating layer 32. In order to satisfy such an etching rate ratio, it is preferable that the primary insulating layer 31 be formed of $SiO_2$ and/or SiON and the auxiliary insulating layer 32 be formed of $Al_2O_3$ and/or $Si_3N_4$.

Figure 11:
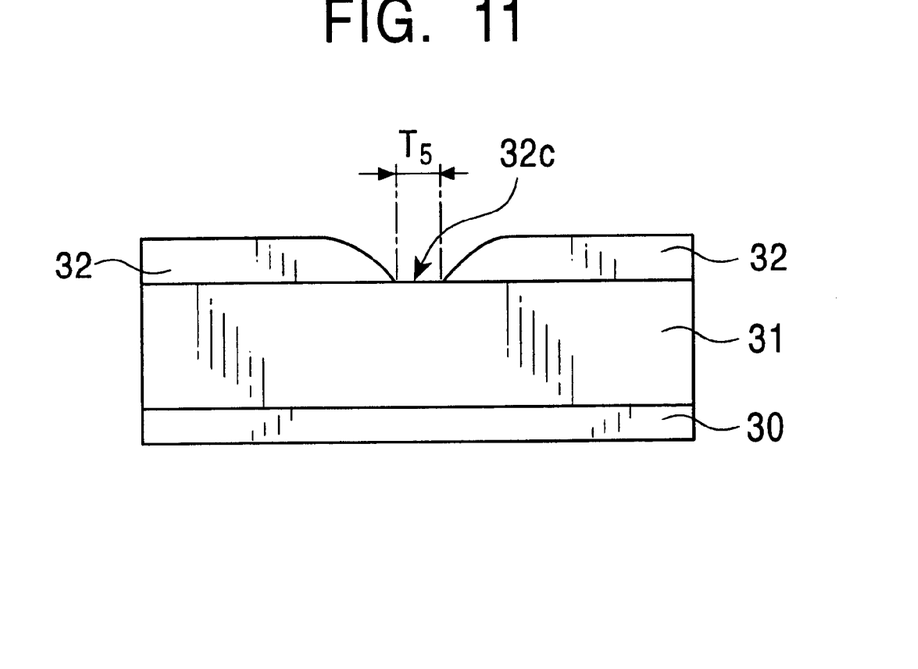
FIG. 11 is a partial front view showing the removal of the lift-off resist layer of the thin-film magnetic head shown in FIG. 4.

With reference to FIG. 11, the lift-off resist layer 33 shown in FIG. 10 is removed. The auxiliary insulating layer 32 formed on the primary insulating layer 31 has a gap 32c having a width $T_5$. The width $T_5$ of the gap 32c is substantially the same as or slightly larger than the bottom width $T_4$ of the lift-off resist layer 33.

When the top face 33a of the lift-off resist layer 33 has a width corresponding to the resolution in the exposure and developing process, the bottom width $T_4$ of the lift-off resist layer 33 is smaller than the resolution. As a result, the width $T_5$ of the gap 32c formed in the auxiliary insulating layer 32 is also smaller than the resolution.

Figure 12:
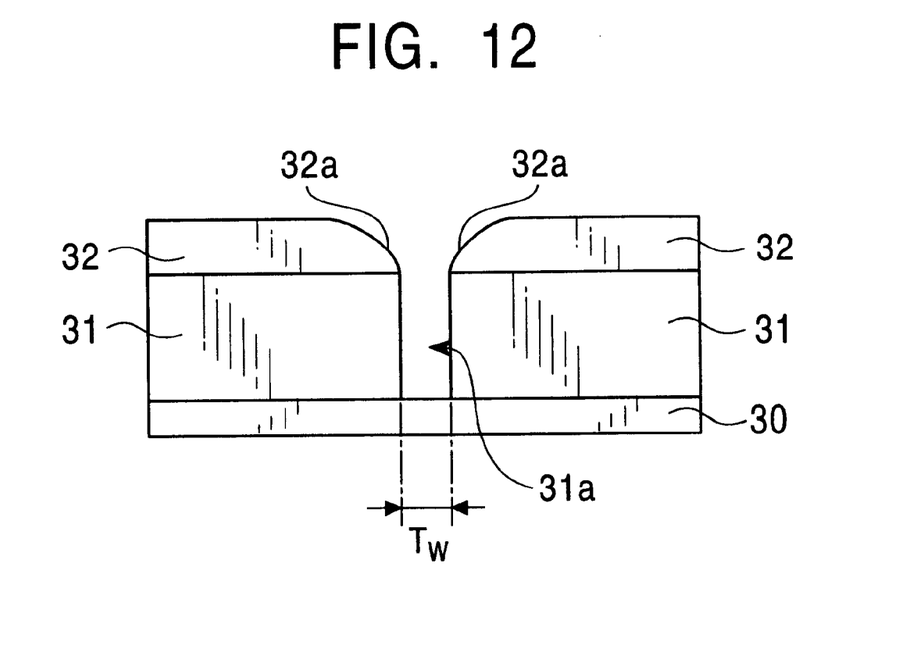
FIG. 12 is a partial front view showing the formation of the groove in the primary insulating layer of the thin-film magnetic head shown in FIG. 4.

With reference to FIG. 12, a groove 31a is formed in the primary insulating layer 31 by a reactive ion etching process.

As described above, the etching rate of the insulating material used for the primary insulating layer 31 is higher than the etching rate of the insulating material used for the auxiliary insulating layer 32 in the reactive ion etching process. In the present invention, it is preferable that the etching rate of the primary insulating layer 31 be at least ten times higher than the etching rate of the auxiliary insulating layer 32. In this case, the primary insulating layer 31 is selectively etched while the auxiliary insulating layer 32 is not substantially etched during the reactive ion etching process. Thus, the auxiliary insulating layer 32 functions as a mask in the reactive ion etching process in order to selectively etch the primary insulating layer 31 exposed by the gap 32c.

As shown in FIG. 12, the groove 31a for defining the track width extending from the surface of the primary insulating layer 31 to the surface of the lower core layer 30 is formed by the reactive ion etching process.

Since the width $T_5$ of the gap 32c in the auxiliary insulating layer 32 is smaller than the resolution of the resist in the reactive ion etching process and the auxiliary insulating layer 32 functions as the mask for selectively etching the primary insulating layer 31 exposed at the gap 32c. The width of the groove 31a formed in the primary insulating layer 31 is also smaller than the resolution. Since the width of the groove 31a defines the track width $T_w$, the track width $T_w$ is also smaller than the resolution in the reactive ion etching process. Thus, the thin-film magnetic head is suitable for future smaller tracks which are required for higher recording densities.

In the present invention, a lower magnetic pole layer and a magnetic gap layer are formed, in that order, on the lower core layer 30 in the groove 31a. Alternatively, a magnetic gap layer and an upper magnetic pole layer are formed, in that order, on the lower core layer 30 in the groove 31a. Alternatively, a lower magnetic pole layer, a magnetic gap layer, and an upper magnetic pole layer are formed in that order in the groove 31a. Moreover, an upper core layer is formed over the topmost layer in the groove 31a and the convex sloping faces 32b of the auxiliary insulating layer 32 by a frame plating process.

According to the above method for making the thin-film magnetic head of the present invention, the width of the groove 31a defining the track width $T_w$ is smaller than the resolution of the resist layer. Thus, the thin-film magnetic head is suitable for narrower tracks which are required for future higher recording densities. Moreover, the auxiliary insulating layer 32 has two convex sloping faces 32b which are symmetrically formed and gradually converge toward the lower core layer 30 in the track width direction. Thus, write fringing can be effectively prevented.

What is claimed is:

1. A thin-film magnetic head comprising:

a lower core layer, the lower core layer having a lower magnetic pole layer thereon;

an upper core layer, the upper core layer having an upper magnetic pole layer thereunder;

at least one insulating layer disposed between the lower core layer and the upper core layer, the insulating layer having a groove for defining a track width, at least one of the lower magnetic pole layer and the upper magnetic pole layer being provided in the groove; and a magnetic gap layer provided between the lower core layer and the upper core layer;

wherein the insulating layer comprises at least one primary insulating layer lying at the lower core layer side and at least one auxiliary insulating layer formed on the primary insulating layer, the primary insulating layer comprises at least one insulating material selected from the group consisting of $SiO_2$, TiO, WO, $WO_3$, and SiON, the auxiliary insulating layer comprises at least one insulating material selected from the group consisting of $Al_2O_3$ and $Si_3N_4$, the groove is formed at least in the primary insulating layer, the auxiliary insulating layer has sloping faces gradually diverging in the track width direction from both top edges of the groove to the surfaces of the auxiliary insulating layer, and the upper core layer is formed on the sloping faces; and wherein the groove has a width of not more than 0.3 μm.

2. A thin-film magnetic head according to claim 1, wherein the primary insulating layer comprises at least one of $SiO_2$ and SiON and the auxiliary insulating layer comprises at least one of $Al_2O_3$ and $Si_3N_4$.

* * * * *